H. Martinson,

Shaft Coupling.

No. 110,259.   Patented Dec. 20, 1870.

United States Patent Office.

HENRY MARTINSON, OF HAWKSVILLE, CANADA.

Letters Patent No. 110,259, dated December 20, 1870.

IMPROVEMENT IN THE MODE OF BALANCING SHAFTS.

The Schedule referred to in these Letters Patent and making part of the same.

*To all whom it may concern:*

Be it known that I, HENRY MARTINSON, of Waterloo, in the Province of Ontario and Dominion of Canada, have invented a new and improved Balance for Shafting, Cylinders, &c.; and I do hereby declare that the following is a full, clear, and exact description thereof, which will enable others skilled in the art to make and use the same, reference being had to the accompanying drawing forming part of this specification, in which—

Similar letters of reference indicate corresponding parts.

Figure 1:
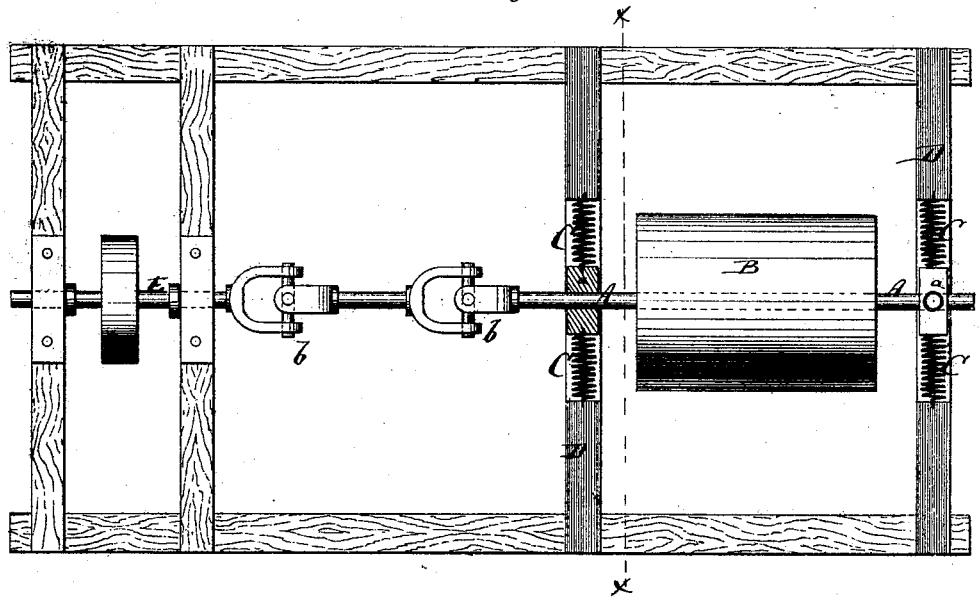
Figure 1 represents a plan view, partly in section, of my invention.
Figure 2:
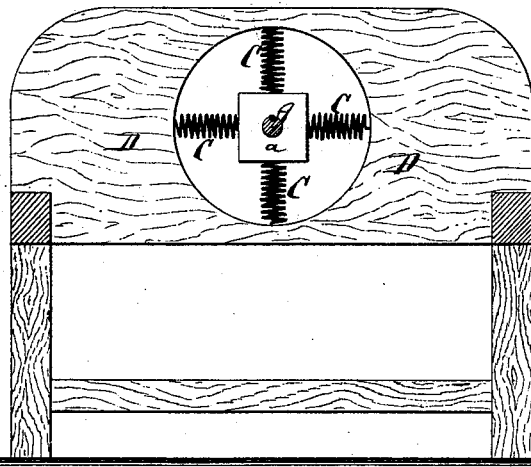
Figure 2 is a transverse section of the same, $x\ x$ being the section-line.

This invention has for its object so to hang and balance shafting, drums, cylinders, and other rotary machinery, that the same may be properly tested while running, to ascertain whether the center of gravity is properly distributed along their axes.

The chief difficulty hitherto experienced in balancing cylindrical rotary bodies consists in the disproportionate inequality at the opposite ends of the cylinder, the balancing of one end leaving the other end, and thereby the entire body, usually as inaccurate as though not at all balanced.

My invention overcomes this difficulty by providing for the simultaneous balancing of both ends, and thereby the entire body of the cylinder.

My invention consists in the application of yielding bearings for both ends of the cylindrical body to be balanced, and in the connection therewith of a jointed driving-shaft, which will allow the adjustment and oscillation of the driven end of said cylinder.

$a\ a$ are the journal-boxes or bearings for the two ends of the shaft A, that carries the cylinder or drum B, or other heavy rotating device to be tested.

Each of said bearings or boxes $a$ is arranged between four, more or less, springs or cushions, C C.

These springs are made of coiled metal, or other suitable material, and are secured in the stationary frame D, and disposed around the bearings to evenly balance the same between them.

The drum, cylinder, or other weight on the shaft, will, if unevenly balanced or weighted, so as to be heavier on one side than on the other, at one or both ends, cause the oscillating movement of the said cylinder in and with its bearings, the springs yielding to such motion.

The amount of oscillation can be readily ascertained at either end by a pencil, chalk, or other marker, and the balance adjusted in accordance with such marks.

The shaft A is, by universal joints $b\ b$, connected with the driving-shaft E, whereby that end of the cylinder to which the power is applied will be allowed to swing as well as its other end.

Having thus described my invention,

I claim as new and desire to secure by Letters Patent—

The balance for cylindrical bodies, composed of the springs C C and bearings $a\ a$, and combined with the jointed driving-shaft, substantially as herein shown and described.

HENRY MARTINSON.

Witnesses:
 WILLIAM BROCK,
 J. HUGHES.